(12) United States Patent
Li et al.

(10) Patent No.: US 8,213,753 B2
(45) Date of Patent: Jul. 3, 2012

(54) SYSTEM FOR DELIVERING THE OUTPUT FROM AN OPTICAL FIBRE

(75) Inventors: Cheng Li, Rugby (GB); Iain Botheroyd, Rugby (GB); Steffan Lewis, Munich (DE); Glyn Edwards, Braunston (GB); Stephen Keen, Leamington Spa (GB)

(73) Assignee: GSI Group Ltd., Rugby, Warwickshire (GB)

( * ) Notice: Subject to any disclaimer, the term of this patent is extended or adjusted under 35 U.S.C. 154(b) by 372 days.

(21) Appl. No.: 12/633,351

(22) Filed: Dec. 8, 2009

(65) Prior Publication Data

US 2010/0124393 A1     May 20, 2010

Related U.S. Application Data

(63) Continuation of application No. PCT/GB2008/050386, filed on May 29, 2008.

(30) Foreign Application Priority Data

Jun. 13, 2007 (GB) .................................. 0711375.6

(51) Int. Cl.
*G02B 6/26* (2006.01)
*G02B 6/42* (2006.01)
*G02B 6/10* (2006.01)

(52) U.S. Cl. ............................. 385/29; 385/31; 385/129
(58) Field of Classification Search ...................... 385/29
See application file for complete search history.

(56) References Cited

U.S. PATENT DOCUMENTS

| 4,509,820 | A | 4/1985 | Murata et al. |
| 5,291,570 | A | 3/1994 | Filgas et al. |
| 7,306,376 | B2 | 12/2007 | Scerbak et al. |
| 2002/0021866 | A1 | 2/2002 | Everett et al. |
| 2006/0029345 | A1 | 2/2006 | Fushimi |
| 2006/0188204 | A1 | 8/2006 | Fidric |
| 2006/0188213 | A1 | 8/2006 | Griffin |
| 2007/0041083 | A1 | 2/2007 | Di Teodoro |

FOREIGN PATENT DOCUMENTS

| GB | 1499359 | A | | 2/1978 |
| GB | 2068142 | A | | 8/1981 |
| GB | 2183360 | A | | 6/1987 |
| GB | 2246875 | A | | 2/1992 |
| JP | 09152513 | | * | 6/1997 |
| JP | 09152513 | A | | 6/1997 |
| WO | 2007039893 | A | | 4/2007 |
| WO | 2007148127 | A | | 12/2007 |

* cited by examiner

*Primary Examiner* — Uyen Chau N Le
*Assistant Examiner* — Kajli Prince
(74) *Attorney, Agent, or Firm* — Gesmer Updegrove LLP

(57) ABSTRACT

A termination for an optical fiber is disclosed, including an end cap optically connected to a delivery end of the fiber and tapering its towards its proximal end so as to expand the signal beam output by the fiber, a capillary having a bore mounted so that the end cap and an end portion of the delivery fiber are mounted within the bore, the capillary having an end which is angled so as to reflect undesired radiation within the capillary away from the fiber, and a cladding mode stripper arranged upstream of the delivery end.

25 Claims, 4 Drawing Sheets

SYSTEM FOR DELIVERING THE OUTPUT FROM AN OPTICAL FIBRE

PRIORITY

The present application is a continuation application of and claims priority to Patent Cooperation Treaty (PCT) Application No. PCT/GB2008/050386 filed May 29, 2008, which claims priority to United Kingdom Patent Application No. GB 1711375.6 filed Jun. 13, 2007.

This invention relates to a system for delivering an output from an optical fibre. In particular, but not exclusively, it relates to a system for delivering the output from a high powered fibre laser.

Cladding pumped fibre lasers are becoming more common. In these types of lasers, a core of an optical fibre is doped with a rare earth element to become an active gain medium and pump radiation is applied via a cladding layer. The pump radiation is normally produced by semi-conductor laser diodes and a means is provided for coupling their input into the cladding of the rare earth doped fibre. Bragg gratings formed in the core of the optical fibre are employed as mirrors to form a laser cavity. The generated laser beam is transmitted through the optical fibre and is delivered at an output end to a workpiece.

Typically most fibre lasers are designed to operate as near diffraction limited sources consequently the fundamental mode field diameter is less than 50 μm, more typically less than 10 μm for a 1 μm fibre laser. Fibre lasers can produce hundreds of Watts or even thousands of Watts of power contained within this mode field diameter. The intensity created by this magnitude of power and contained within such a small area is at a level that can damage the surface of the fibre at the fibre/air interface.

Furthermore, errant radiation can be produced and it can take many forms. For instance, when material processing with the output from a fibre laser, there will be a proportion of back reflected light which is incident upon the end of the fibre. Potentially, this light, if allowed to travel back into the fibre, could damage part of the beam delivery assembly. In addition, some of the back reflected light may be incident upon the cladding layer of a delivery fibre (an optical fibre has a core and one or more cladding layers). If allowed to propagate within the cladding layer in this reverse direction, this back reflected light may enter the fibre laser itself and this could cause considerable damage. There are other types of undesired radiation that it is also advantageous to try to reduce.

There is a need therefore, for an improved fibre delivery output system that overcomes the above shortcomings.

SUMMARY

The present invention arose in an attempt to provide an improved termination or fibre delivery output which reduces damage to the fibre assembly and improves performance.

According to the invention, in a first aspect, there is provided a termination for an optical fibre, including an end cap optically connected to a delivery end of the fibre and tapering towards its proximal end so as to expand the signal beam output by the fibre, a capillary having a bore mounted so that the end cap and an end portion of the delivery fibre are mounted within the bore, the capillary having an end upstream from the delivery end which is angled so as to reflect undesired radiation within the capillary away from the fibre, and a cladding mode stripper arranged upstream of the capillary.

The capillary is preferably angled at an angle of between around 45 to 55°, preferably 49° at which internal reflection occurs to cause radiation captured by the capillary to be transmitted safely away from the fibre assembly.

The invention further provides an optical fibre arrangement having a delivery end provided with a termination as described above.

The optical fibre arrangement or system is preferably a fibre laser although the invention may be of benefit for any other type of optical fibre. For example, it may provide an optical fibre which delivers the signal or beam from a separate laser apparatus of any construction, or it may be an optical fibre which transmits any kind of signal or beam, whether a laser signal or otherwise.

BRIEF DESCRIPTION OF THE DRAWINGS

Embodiments of the invention will now be described, by way of example only, with reference to the accompanying drawings, in which.

DETAILED DESCRIPTION

Figure 1:
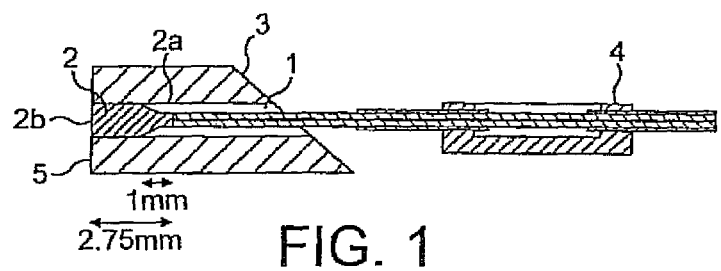
FIG. 1 shows a beam delivery end of an optical fibre.
Figure 2:
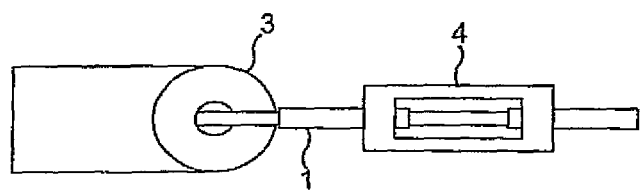
FIG. 2 shows the end of FIG. 1 viewed from above.

Referring to FIG. 1, a delivery end of an optical fibre 1 is shown provided with means for expanding the signal beam and means for reducing the amount of radiation which can find its way back to the input end of the fibre or back into a laser generating part of the fibre.

In the example described below, the fibre (the signal fibre) consists of a 10 μm core A, a 125 μm glass cladding 12 and 250 μm diameter polymer coating 11 which makes up an outer cladding. In other embodiments, these dimensions may vary of course.

Mounted to or in the vicinity of the delivery end 1 of the fibre are, respectively, an optical element (herein also termed end cap) 2, an angled capillary tube 3 and a cladding mode stripper 4.

Figure 6:
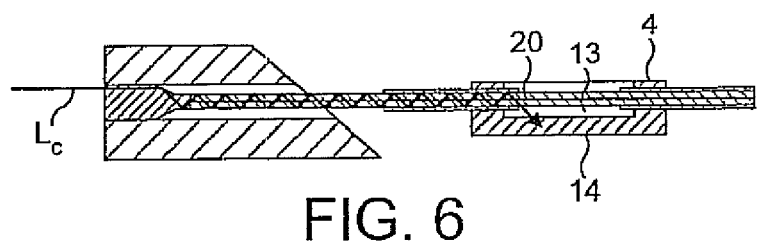
FIG. 6 shows the effects on the close-to-centre back reflection.
Figure 7:
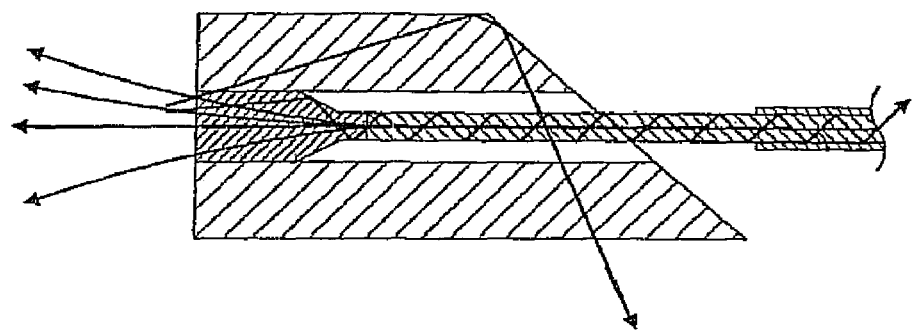
FIG. 7 shows combined effects of a delivery end formed in accordance with the present invention.
Figure 8:
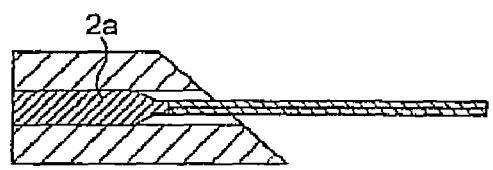
FIG. 8 shows an end cap and capillary mounted to a fibre.
Figure 9:
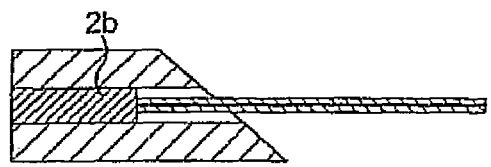
FIG. 9 shows an alternatively, non-tapered, end cap mounted to a fibre and capillary.

The end cap is typically of glass and may be tapered, as shown schematically in FIGS. 4 to 7, and also as shown at 29 in FIG. 8, or may alternatively not be tapered, as shown at 26 in FIG. 9, in which case it may be a cylindrical glass element. The maximum diameter of the end cap (optical element) is preferably the same, or a little less, than the internal diameter of the bore of the capillary, so that the end cap can fit within said bore.

In some embodiments, the glass end cap is tapered from a distal end 2b which has a diameter of around 400 μm to a proximal end 2a which has a diameter of 125 μm (ie equivalent to the diameter of the inner glass cladding layer of the fibre 1). The tapered proximal end 2a of the end cap is fused to the end 1a of the fibre and the tapered nature of the glass end cap allows for expansion of the signal beam as it leaves the fibre. This serves to lower the glass-air interface intensity to a safe level with minimal loss in beam quality. The tapered end cap also allows efficient splicing of the delivery fibre to the end cap. The better splice to the delivery fibre minimises the chances of fracture between the interface.

The capillary 3 is also of a glass material, typically fused silica (the end cap may also be made of fused silica), and in one embodiment is of outer diameter 1.8 mm with a 410 µm bore. The end cap is tapered from 400 µm to 125 µm over a distance of about 1 mm. Alternatively, the end cap may be cylindrical as described; again it will be of about 400 µm diameter. The signal from the fibre laser itself is contained within the 10 µm core. Thus, when the signal leaves the core, it is allowed to expand within the tapered end cap.

The signal fibre 1 is held away from the walls of the capillary since the capillary bore is of greater diameter than the diameter of the cladding of the fibre. The enlarged part of the end cap helps the spacing. This spacing allows the capillary and end cap to be fused together under high heat without distorting the signal fibre. The fusion process between the capillary and end cap material is one which produces a clear optical interface. The fused end cap and capillary assembly are cleaved and polished to form a high quality optical output surface. As shown in FIG. 1, the distance between the end of the delivery fibre and the end cap might in a typical embodiment be around 2.75 mm. This distance is chosen to allow expansion of the signal beam to fill approximately half of the diameter of the end cap. This ensures that the signal sees an optically perfect path to air that is not subjected to any large diffraction from limiting apertures such as the diameter of the end cap/capillary output aperture. The expanding beam is shown as beam 10 in FIG. 4.

The cladding mode stripper 4 is designed to remove and safely dump power that has been carried in the cladding of the signal fibre. This is shown schematically in FIG. 3. At part of the signal fibre 63 which is upstream from its distal end, the outer polymer cladding layer 11 is stripped away to reveal the cladding 12. The fibre, including the portion stripped of its outer polymer cladding, is potted in a high refractive index material 13. This results in a large portion of any stray radiation which is being guided in the cladding layer 12 being stripped out into the high index material 13. It then passes to a heat sink body 14, which might be of copper or aluminium for example, where it is safely removed.

The high index material may be a UV cured Norland optical glue or similar material, which typically has a refractive index, at a wavelength of 1064 nm, of 1.55 and can withstand a temperature of between about −150 to about +125° C. Alternatively the high index material might be a silicone elastomer or gel having an operating range of from less than −50° to greater then 200° C.

Figure 3:
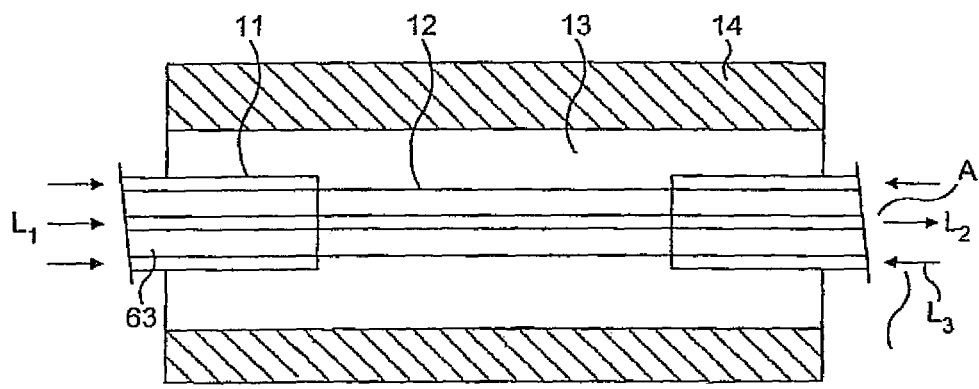
FIG. 3 shows schematically a cladding mode stripper.

As shown in FIG. 3, the cladding mode stripper also serves to strip back reflected radiation $L_3$ from the cladding layers. Thus, any back-reflected radiation which enters the cladding layer will be substantially removed by this device.

Note that the refractive index of the coating on a standard double clad fibre is about 1.37.

The signal fibre may typically consist of a 10 µm core, 125 µm inner glass cladding and 250 µm diameter polymer coating. Removal of the low index outer cladding and potting the stripped fibre in a high index coating means that any light that has been guided in the cladding is stripped out into the high index coating. The copper heat-sink in which the stripped and recoated fibre is potted then removes any excess heat. It has been found that such a cladding mode stripper can strip unwanted light from the cladding with an efficiency of greater than 99%. That is, as shown in FIG. 3, virtually all the light $L_1$ that is input to the cladding mode stripper in the cladding layer is removed and the output $L_2$ contains negligible amounts of radiation in the cladding layer.

If the fibre cladding layer has a diameter of 125 µm, then it is preferred that the cladding mode stripper has a length (ie stripped length of fibre) of at least 4 cm for efficient stripping. If the fibre cladding has a diameter of 400 µm, then the preferred minimum cladding mode stripper length for efficient stripping is 8 cm.

Figure 4:
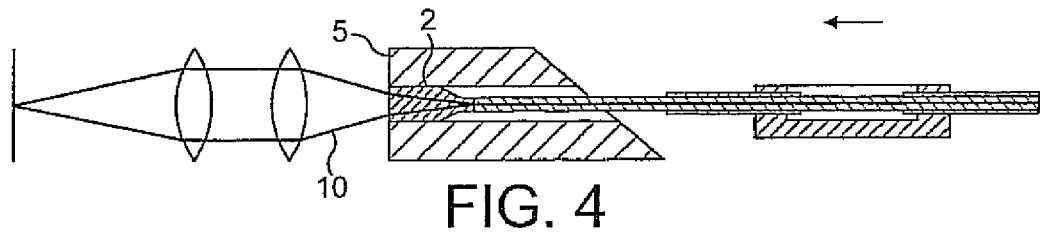
FIG. 4 shows the effect of beam expansion.
Figure 5:
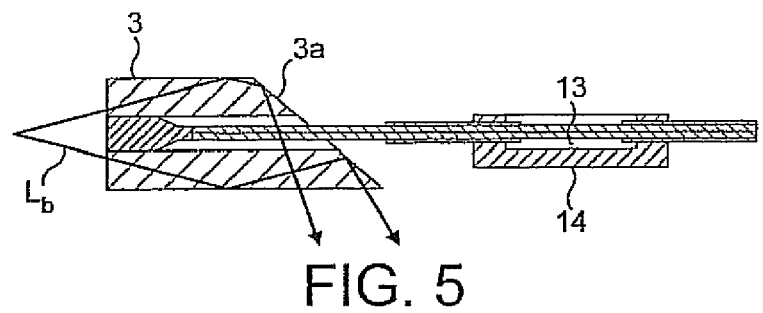
FIG. 5 shows the effects of an angled capillary on off-centre back reflected light.

FIGS. 4 to 6 show the advantageous effects of each of the features of the present invention and FIG. 7 shows the combined effects. The signal in all these figures is of course moving in the leftwards direction and any undesired radiation such as back reflection would be moving generally in the rightwards direction.

Firstly, FIG. 4 shows beam expansion for a forward signal.

The forward going beam can have a power of hundreds of watts which, without the beam-expanding end cap 2 would be emitted in a 10 µm beam (being the diameter of the core) and this equates to an intensity of 130 MW/cm$^2$ per 100 W of output power. This is a very high optical intensity which would be likely to cause damage to the surface of the fibre especially when used in a non-clean room environment. Therefore, a major function of the end cap is to allow the beam to expand to a spot diameter that makes the intensity at the glass air interface 5 acceptable. For a typical single mode fibre with a core size of 10 µm the beam will expand at a rate of 90 µm per mm in glass (at 1 µm) equating to a reduction of approximately $1/(81 \times L^2)$ the intensity of the 10 µm case, where L is in mm. A 2.75 mm end cap reduces the intensity to 0.21 MW per cm$^2$ per 100 W of power. This reduction by almost three orders of magnitude compared to delivery by a cleaved single mode fibre lowers the intensity well away from that needed to cause damage at a glass/air interface.

A further advantage of the enlarged area of the end cap, which would be around 1.8 mm diameter in this case, is that it allows the end cap 2 to be anti-reflection (AR) coated, and this can further reduce to near zero the Fresnel loss of 4%. Where light is travelling from glass to air, a small proportion of the light will always be reflected back into the glass at the interface. This is known as Fresnel loss and is around 4% of the light. Adding an anti-reflection coating to the end cap further reduces this Fresnel loss to near zero.

FIG. 5 shows an advantage of the capillary 3. When material processing with the output from a fibre laser, through an optical fibre, there will be a proportion of back reflected light which is incident upon the end cap. Depending upon the material and the processing conditions, this back reflected light may represent a significant proportion of the forward going light from the fibre delivery system. The back reflected light will have a wide range of incident angles on the end cap. Potentially this light could damage any part of the beam delivery assembly. To counter this errant radiation, the back end (ie upstream end) 3a of the capillary is angled, preferably at an angle of between around 44 to 55° and most preferably at around 49°, to safely reflect out of the assembly this errant radiation, as shown at $L_B$ in FIG. 5. Thus, back reflected light or other errant radiation, which finds its way into the capillary is safely reflected out of the assembly. It may be reflected to a heat-sink (not shown) for example.

FIG. 6 shows how back-reflection which is close to the centre is removed by the cladding mode stripper 4.

Some of the back reflected light will be incident on the end cap at a low angle close to the axis of the capillary such that it will be guided in the cladding of the double clad delivery fibre. This is shown schematically as light $L_C$ in FIG. 6 and at $L_A$ in FIG. 7. To safely remove this light from entering the fibre laser itself, the light is stripped in the cladding mode stripper 4. This is shown at point 20 where the back reflected light which was captured in the cladding layer of the delivery fibre leaves the cladding region through the high index potting compound and into the heat-sink 14.

Figure 10:
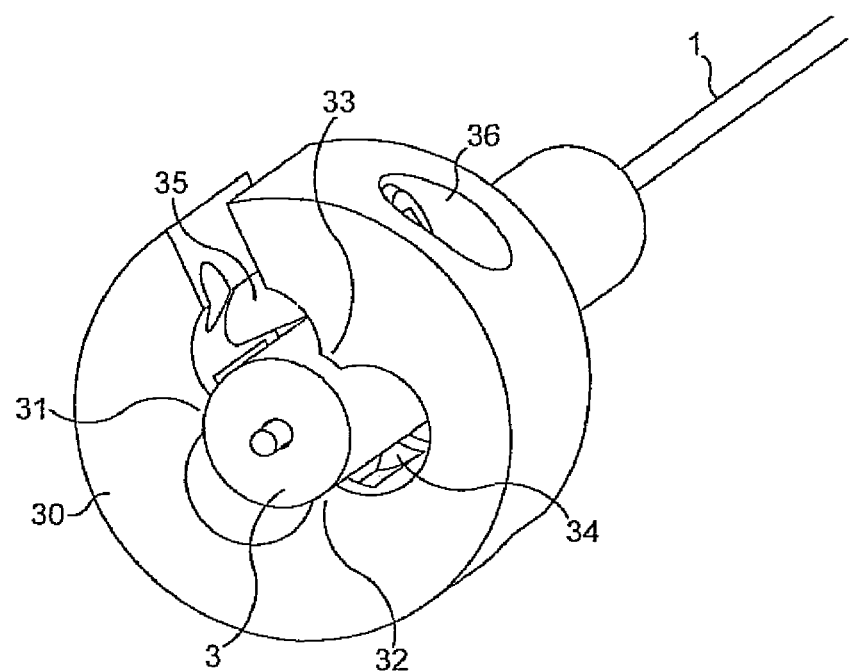
FIG. 10 shows a mounted capillary.
Figure 11:
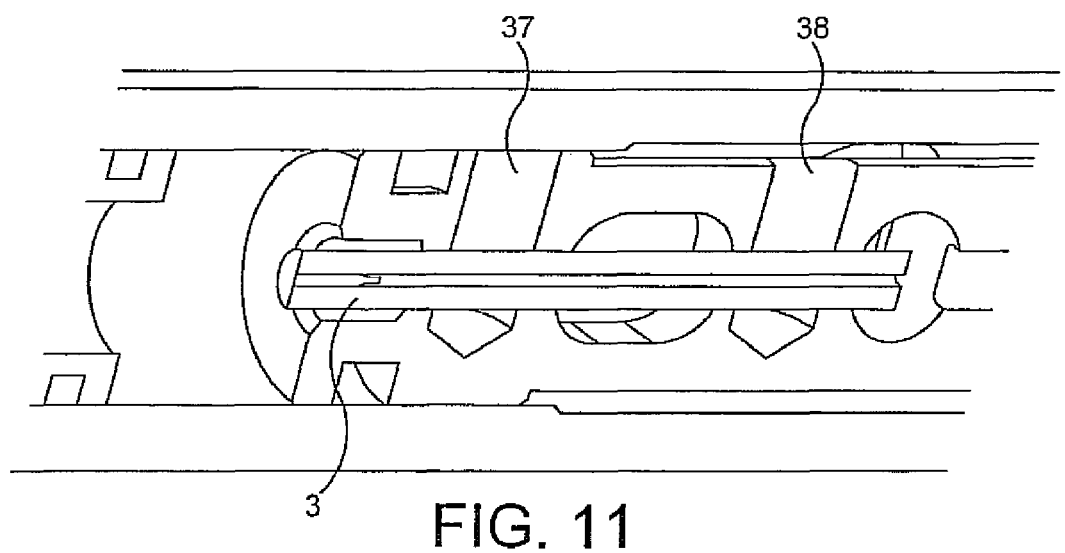
FIG. 11 shows an alternatively-mounted capillary.

The capillary tube 3 may be mounted in the bore of a mount which may take any suitable form. Two embodiments are shown in FIGS. 10 and 11 but other mounting methods may, of course, be used. FIG. 10 shows an embodiment in which the capillary tube 3 is held in a split metal clamp 30. The clamp has a bore that is relieved axially and peripherally to reduce contact with the tube.

In the embodiment of FIG. 10, the clamp 30 includes six projections, three of which, 31, 32, 33, are provided generally at one end of the mount and hold the capillary firmly at this end. Three similar projections towards the rear of the mount, of which one, 34, is shown in the figure, hold the capillary at the rear of the mount 30. There are therefore in effect only point contacts (or at least contacts which are as small as possible) holding the capillary to reduce contact with the tube. The tube in this example is therefore held at three points towards one end and at three points further down. Of course, other numbers of point contacts may be used with the aim of relieving the contact both axially and peripherally to reduce contact with the tube to a minimum while still retaining firm contact with the tube to position it. The split clamp is held together by means of a pin, bolt or other means 35 which is tightened, preferably through access recesses 36, in order to clamp the capillary firmly.

FIG. 11 shows an alternative embodiment in which the capillary is glued in place into the bore of a mount. The capillary 3 is glued into the mount by applying glue through gluing ports 37, 38 (there may be any number of gluing ports). The glue used can be of lower refractive index than the glass capillary so as to allow the light contained within the capillary to remain guided.

As shown in FIG. 7, the combined effects of the end cap/termination arrangement including a tapered end cap, an angled capillary and a cladding mode stripper are to reduce the output intensity of the ongoing emitted laser beam and to reduce the effects and damage caused by reflected or other errant radiation. High angle end face reflection ($L_C$) is safely diverted out by the angled capillary 3, and low angle radiation ($L_A$) is reflected back in the cladding layer to the cladding mode stripper and also, by providing an AR coating back-reflection of the end face is reduced and therefore a reduced amount of reflected light is captured by the core itself. Thus, owing to the overall design, the amount of light getting back into the laser via either the core or cladding is greatly reduced. The following advantageous effects are noted:

A. High angle rays are steered out of assembly via the angle capillary.

B. Mid-angle rays, which are captured by the cladding of the delivery fibre, are stripped out in the cladding mode stripper.

C. Due to the distance between the end cap and the end of the fibre, only a very small proportion of light can be retro-reflected back into the core of the delivery fibre.

D. Feedback is further reduced by providing an anti-reflection coating on the end (output) surface of the end cap and/or capillary or, alternatively or additionally, by angling the output surface 5. Thus, the output surface may be at an angle other than 90° to the longitudinal axis of the fibre.

What is claimed is:

1. A termination for an optical fibre, including an optical element optically connected to a delivery end of the fibre, a capillary having a bore mounted so that the optical element and an end portion of the delivery fibre are mounted within the bore, the capillary having an end which is angled so as to reflect undesired radiation within the capillary away from the fibre, and a cladding mode stripper arranged upstream of the delivery end.

2. A termination as claimed in claim 1, wherein the optical element is optically connected both to the end of the core and to the cladding.

3. A termination as claimed in claim 1, wherein the optical element tapers towards its proximal end so as to expand a beam output by the fibre.

4. A termination as claimed in claim 1, wherein the capillary is mounted so that the optical element and optical fibre are longitudinally located within the bore, the capillary having a proximal end which is at an angle other than 0° or 90° to a longitudinal axis of the fibre at that point.

5. A termination as claimed in claim 4, wherein the angle is between around 45 to 55°.

6. A termination as claimed in claim 4, wherein the angle is 49°.

7. A termination as claimed in claim 4, wherein the distal end of the optical element and capillary are in a single plane forming an output surface from which optical radiation is transmitted, and this surface is coated with an anti-reflection coating.

8. A termination as claimed in claim 1, wherein the cladding mode stripper comprises a portion of the optical fibre with at least one outer cladding layer removed, a material of higher refractive index in contact with the stripped portion, and a heat sink in contact with the higher index material.

9. A termination as claimed in claim 8, wherein the fibre cladding has a diameter of 125 µm and the cladding mode stripper has a length of at least 4 cm.

10. A termination as claimed in claim 8, wherein the fibre cladding has a diameter of 400 µm and the cladding mode stripper has a length of at least 8 cm.

11. A termination as claimed in claim 1, wherein the optical element is fused to the capillary to produce a clear optical interface.

12. A termination as claimed in claim 11, wherein the fused optical element and capillary assembly are cleaned and polished to form a high quality optical output surface.

13. A termination as claimed in claim 11, wherein the optical element is tapered over a distance of about 1 mm.

14. A termination as claimed in claim 13, wherein the optical element tapers from a diameter of about 400 µm to 125 µm.

15. A termination as claimed in claim 14, wherein the fibre has a core of 10 µm and a cladding diameter of 125 µm.

16. A termination as claimed in claim 13, wherein the capillary has an outer diameter of 1.8 mm and a bore of diameter 410 µm.

17. A termination as claimed in claim 1, wherein the optical fibre has an outer diameter which is less than the diameter of the bore of the capillary so as to allow the capillary and optical element to be fused together without distorting the fibre.

18. A termination as claimed in claim 17, wherein the capillary is mounted in the bore of a mount.

19. A termination as claimed in claim 18, wherein the mount has a plurality of discrete contact points with the capillary.

20. A termination as claimed in claim 19, wherein the mount is a split clamp having a bore which is relieved axially and peripherally to reduce contact area with the capillary.

21. A termination as claimed in claim 18, wherein the capillary is held by a glue of lower refractive index than the capillary.

22. A termination as claimed in claim 1, wherein the distance between the end of the delivery fibre and the optical element is sufficient to allow expansion of a signal beam to fill about half the diameter of the end cap.

23. A termination as claimed in claim 1, wherein an output surface is at an angle other than 90° to the longitudinal axis of the fibre.

24. An optical fibre arrangement having a delivery end provided with a termination as claimed claim 1.

25. A system for delivering the output from an optical fibre, comprising a termination as claimed in claim 1.

* * * * *